United States Patent Office.

OSCAR BALLY, OF MANNHEIM, GERMANY, ASSIGNOR TO THE BADISCHE ANILIN AND SODA FABRIK, OF LUDWIGSHAFEN, GERMANY.

BLUISH DYE AND PROCESS OF MAKING SAME.

SPECIFICATION forming part of Letters Patent No. 619,115, dated February 7, 1899.

Application filed May 20, 1898. Serial No. 681,254. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of New Mordant-Dyeing Coloring-Matters, of which the following is a specification.

As is well known, naphthazarin can be prepared by heating 1.5-dinitro-naphthalene with concentrated or fuming sulfuric acid with or without the addition of reducing agents. In this manufacture a body is formed which is known as the "naphthazarin intermediate product." The chemical constitution of this body has never been definitely ascertained and described, and the substance is known under this name only, both in patents and in general scientific literature. It is more particularly described in the specification of the German Patent No. 76,922, published on the 21st of August, 1894, in the following terms: Its solution in concentrated sulfuric acid (containing about ninety-five per cent. $H_2SO_4$) is brown. In dilute sulfuric acid it dissolves with a pure blue color. This color is not appreciably changed on adding caustic-soda lye; but if an excess of hydrochloric acid be added to the dilute sulfuric-acid solution the color turns to a greenish brown. When isolated, this naphthazarin intermediate product is a violet powder, possessing a metallic luster, slightly soluble in water and giving a blue solution, which is not changed in color by the addition of sodium carbonate or of a caustic-soda lye. In the presence of a little hydrochloric acid it dissolves readily with a pure blue color. If the solution in dilute sulfuric acid be boiled, the blue color changes to red and on cooling naphthazarin separates out. It is this naphthazarin intermediate product which can be obtained, as described, from 1.5-dinitro-naphthalene, which constitutes the initial material for my invention. I prepare from it a new series of mordant-dyeing coloring-matters by combining it with phenolic bodies, and I have described this invention in an application for patent, Serial No. 681,253, filed May 20, 1898, which contains a generic claim for the new series of coloring-matters and specific claim for the new coloring-matter from the said naphthazarin intermediate product and phenol itself. In this present application I desire to claim a specific new dyestuff prepared from the naphthazarin intermediate product and alpha naphthol.

The following example will illustrate the manner in which my invention can be carried into practical effect and the new coloring-matter obtained, which dyes chrome-mordanted wool, giving bluish-gray shades from a boiling bath and blue shades when dyed more precautiously in the water-bath.

Prepare a naphthazarin melt in the usual way—that is, by heating 1.5-dinitro-naphthalene with concentrated or fuming sulfuric acid with the addition of a reducing agent. To about one thousand parts of this melt obtained by the use of about fifty parts of dinitro-naphthalene add about seventy parts of alpha naphthol at the ordinary temperature. Stir the mixture for about twenty-four hours. Pour it onto ice-water. The rather difficultly-soluble dyestuff separates out in grayish-blue flocks. Collect by filtering, wash, and dry. Allowing the filtrate to stand more dyestuff will separate out.

My new dyestuff which I desire to claim when in the form of powder has a gray appearance. It is easily soluble both in cold and in hot water, yielding a greenish-blue solution. The solution in concentrated sulfuric acid is dirty reddish brown in color. It is rather insoluble in alcohol. It is but little soluble in cold anilin and yields when heated therewith a bluish-green solution. It dyes chrome-mordanted wool grayish-blue shades when dyed in the manner used for dyeing naphthazarin—*i. e.*, dyeing in the boiling bath for, say, two and one-half hours. When dyeing for about only one hour on the water-bath, the shades obtained are of a much purer blue color.

Now what I claim is—

As a new article of manufacture the new coloring matter which can be obtained by heating 1.5-dinitro-naphthalene with sulfuric acid so as to obtain the naphthazarin intermediate product, and adding alpha-naphthol to the sulfuric-acid solution of this body, and which dissolves in water giving a greenish-blue solution, and gives a dirty reddish-brown color
5 in sulfuric acid, and a bluish-green color in anilin, substantially as described.

In testimony whereof I have hereunto set my hand in the presence of two subscribing witnesses.

OSCAR BALLY.

Witnesses:
GUSTAV LICHTENBERGER,
ADOLPH REUTLINGER.